United States Patent Office.

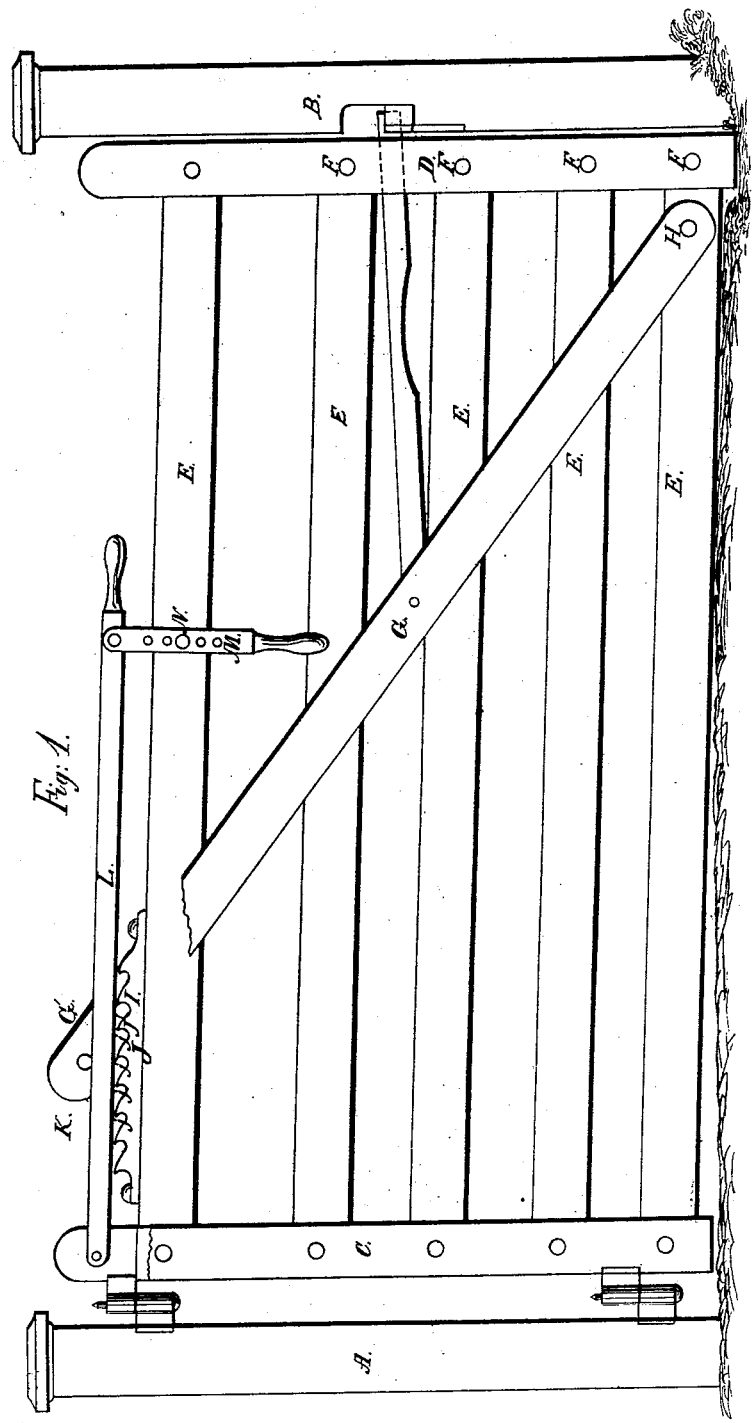

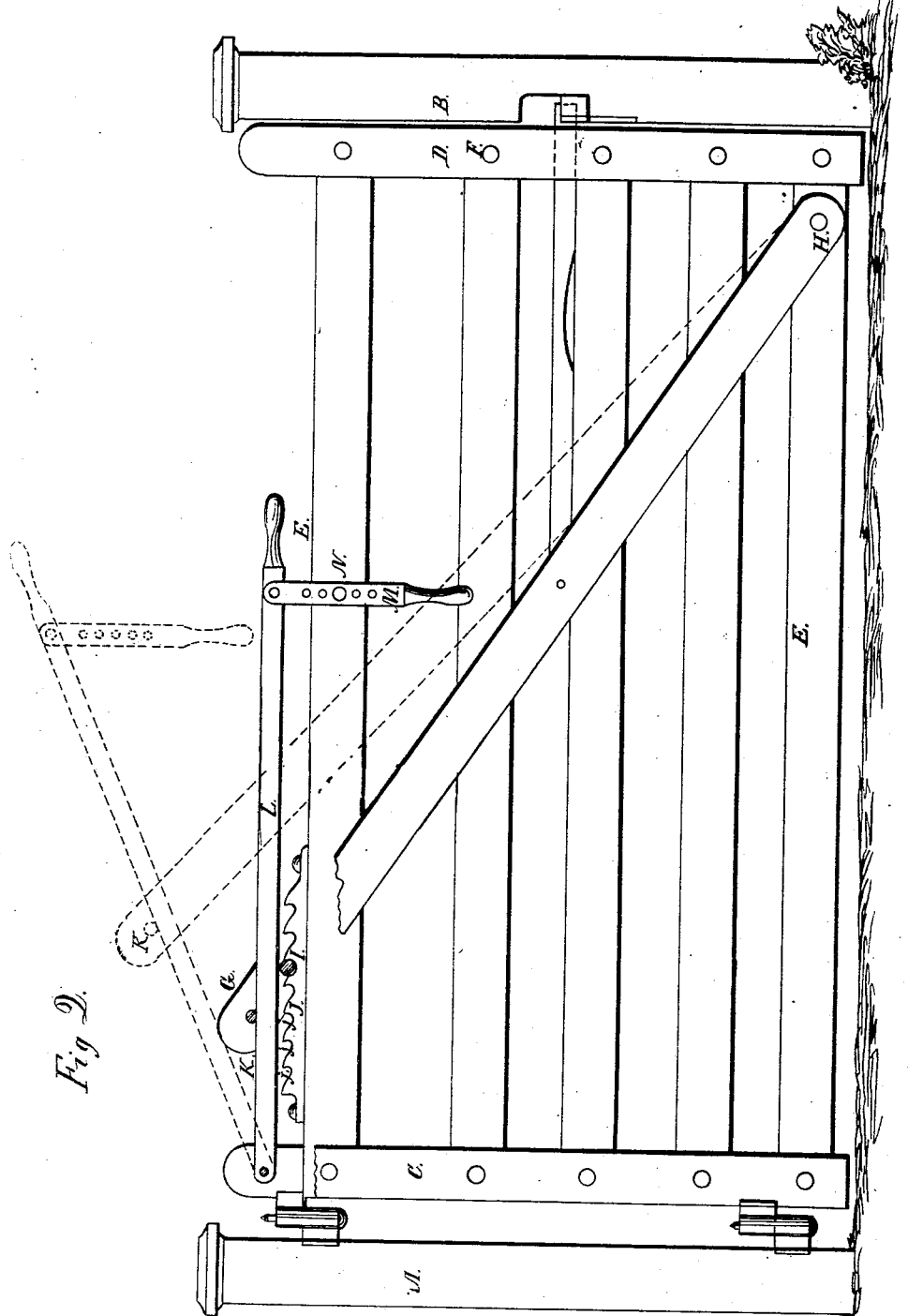

JOHN DICKASON, OF VEVAY, INDIANA.

Letters Patent No. 61,725, dated February 5, 1867.

---

IMPROVEMENT IN FARM GATES.

---

The Schedule referred to in these Letters Patent and making part of the same.

---

WHOM IT MAY CONCERN:

Be it known that I, JOHN DICKASON, of Vevay, Switzerland county, Indiana, have invented a new and useful Improvement in Gates; and I do hereby declare the following to be a full, clear, and exact description thereof, reference being had to the accompanying drawings, making part of this specification.

This invention consists in a device for restoring farm and other gates to their proper rectangular shape when sagging.

Figure 1 is a side elevation of my gate, in a sagged condition.

Figure 2 shows the same gate restored to its proper elevation and rectangular form.

A and B represent respectively the hinge and latch-posts of an ordinary farm gate. The stiles C D are secured to the rails E by round bolts or pins, F. A diagonal brace, formed of two strips, G G', which embrace the rails, one on each side thereof, is pivoted to the bottom rail near its front end by a bolt, H, and the strips are traversed near their upper ends by a bolt, I, which may be made to engage in either one of a series of notches, $j$, in a rack, J, which is secured to the top of the upper rail near its rear end. K is a bolt which connects the extreme tops of the braces. L is a lever, which being pivoted to the rear stile, near its upper end, passes forward between the upper and lower bolts I and K, and enables the operator to either lift the brace clear of the rack for readjustment or to secure any particular adjustment by pressing the bolt I down firmly in the selected notch. In order to retain the lever to any specific adjustment, and to prevent the elevation of the gate by hogs or cattle, I attach to the lever L an arm, M, perforated to receive a pin, N, which traverses both the arm and the top rail of the gate.

I claim herein as new, and of my invention—

The combination of the rack J $j\,j$ with the brace G G', pin I, lever L, and detaining-bar M, all arranged to operate in the manner and for the purposes set forth.

In testimony of which invention I hereunto set my hand.

JOHN DICKASON.

Witnesses:
GEO. H. KNIGHT,
JAMES H. LAYMAN.